(12) United States Patent
Wu et al.

(10) Patent No.: US 11,791,942 B2
(45) Date of Patent: Oct. 17, 2023

(54) METHOD AND DEVICE FOR RESPONDING TO DATA RECEIVED BY MULTIPLE LINKS

(71) Applicant: CHENGDU XGIMI TECHNOLOGY CO., LTD., Sichuan (CN)

(72) Inventors: Hao Wu, Sichuan (CN); Fang Xie, Sichuan (CN); Yang Liao, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/600,128

(22) PCT Filed: Jul. 17, 2020

(86) PCT No.: PCT/CN2020/102679
§ 371 (c)(1),
(2) Date: Sep. 30, 2021

(87) PCT Pub. No.: WO2021/243819
PCT Pub. Date: Dec. 9, 2021

(65) Prior Publication Data
US 2023/0079733 A1    Mar. 16, 2023

(30) Foreign Application Priority Data
Jun. 3, 2020   (CN) .......................... 202010495582.0

(51) Int. Cl.
*H04W 4/70*   (2018.01)
*H04L 1/1607*   (2023.01)

(52) U.S. Cl.
CPC .......... *H04L 1/1621* (2013.01); *H04L 1/1685* (2013.01)

(58) Field of Classification Search
CPC .. G06F 3/0482; G06F 3/0484; G06F 3/04842; G06F 3/04845; G06F 3/0488; G06F 3/16; G06F 3/167; G06T 11/60; G06T 2200/24; G06T 3/60; H04N 1/3877
See application file for complete search history.

(56) References Cited

U.S. PATENT DOCUMENTS

| | | | |
|---|---|---|---|
| 10,057,747 B2* | 8/2018 | Alpert | .................. H04L 1/1614 |
| 2018/0184233 A1 | 6/2018 | Alpert et al. | |

(Continued)

FOREIGN PATENT DOCUMENTS

| | | |
|---|---|---|
| CN | 109587052 A | 4/2019 |
| CN | 110199494 A | 9/2019 |

(Continued)

OTHER PUBLICATIONS

International Search Report for corresponding application PCT/CN2020/102679 filed Jul. 17, 2020; dated Feb. 20, 2021.

(Continued)

*Primary Examiner* — Phuc H Tran
(74) *Attorney, Agent, or Firm* — Gang Yu (57) ABSTRACT

Disclosed are a method and device for responding to data received by multiple links. The method includes that: a message initiator sends an Add Block ACK (ADDBA) request message to a message responder on multiple links respectively; the message initiator receives an ADDBA response message sent by the message responder on multiple links respectively, the ADDBA response message containing the parameter ML-BA Policy which indicates that the message responder allows usage modes of a multi-link collaborative block acknowledgement policy; and the message initiator sends a converged packet to the message responder on multiple links respectively.

12 Claims, 1 Drawing Sheet

(56) References Cited

U.S. PATENT DOCUMENTS

| | | | |
|---|---|---|---|
| 2018/0205502 A1* | 7/2018 | Merlin | H04B 1/1615 |
| 2018/0206284 A1 | 7/2018 | Zhou et al. | |
| 2019/0150214 A1 | 5/2019 | Zhou et al. | |
| 2020/0037288 A1 | 1/2020 | Huang et al. | |
| 2020/0077417 A1 | 3/2020 | Seok et al. | |
| 2020/0137626 A1 | 4/2020 | Huang et al. | |
| 2022/0124852 A1* | 4/2022 | Kim | H04L 1/1685 |

FOREIGN PATENT DOCUMENTS

| | | | |
|---|---|---|---|
| CN | 110199549 A | 9/2019 |
| CN | 110572244 A | 12/2019 |
| CN | 111066271 A | 4/2020 |
| JP | 2016535953 A | 11/2016 |
| WO | 2018136522 A1 | 7/2018 |

OTHER PUBLICATIONS

Lin, Ming. "Investigation of the Fifth Wi-Fi Technology and Standardization". Electronic Science & Technology. vol. 03, No. 04. Jul. 10, 2016 (Jul. 10, 2016).

Rojan Chitrakar et al., Multi-link acknowledgment, IEEE 802.11-19/15 12r5, Nov. 13, 2019 (Nov. 13, 2019).

Abhishek Patil et al., MLO: Acknowledgement procedure, IEEE 802.11-20/0024r3, May 6, 2020 (May 6, 2020).

Search Report for corresponding EP application No. 20923674.4.

Insun Jang et al., Indication of Multi-link Information, IEEE 802.11-20/0028r6, Jun. 4, 2020.

\* cited by examiner

METHOD AND DEVICE FOR RESPONDING TO DATA RECEIVED BY MULTIPLE LINKS

TECHNICAL FIELD

The present disclosure relates to the field of wireless communications, in particular to a method and device for responding to data received by multiple links.

BACKGROUND

The 802.11be network, also called an Extremely High Throughput (EHT) network, achieves extremely high throughput through a series of system characteristics and enhanced functions of multiple mechanisms. As the use of Wireless Local Area Network (WLAN) continues to grow, providing wireless data services in many environments (such as homes, enterprises, and hot spots) becomes increasingly important. In particular, video traffic will continue to be the main type of traffic in many WLAN deployments. Because of the emergence of 4K and 8K videos (uncompressed rate of 20 Gbps), requirements for throughput of these applications are developing. New applications with high throughput and low latency, such as virtual reality or augmented reality, game, remote offices and cloud computing, will increase sharply (for example, a real-time game has a latency of less than 5 ms).

Given the high throughput and strict real-time latency requirements of these applications, users expect higher throughput, greater reliability, less latency and jitter, and higher power efficiency when their applications are supported through the WLAN. The users expect improved integration with a Time Sensitive Network (TSN) to support the applications over heterogeneous Ethernet and WLAN. The 802.11be network is designed to ensure the competitiveness of WLAN by further increasing the total throughput and reducing the latency, while ensuring backward compatibility and coexistence with old technical standards. 802.11 compatible devices operate in frequency bands 2.4 GHz, 5 GHz and 6 GHz.

In the 802.11be network, in order to achieve the above purpose, it is proposed that multiple data transmission links can be established between a terminal and an access point, and the transmission rate is improved by the simultaneous transmission of the multiple links.

SUMMARY

In the 802.11 network, in order to ensure the reliability of the network, every time a sender sends a packet, a receiver needs to return an ACK message to the sender to inform the sender whether the packet is received correctly. With the increase of network data rate, the network allows the receiver to give feedback to multiple packets after the sender sends the multiple packets, so a message as a feedback to the multiple packets is called a Block ACK (BA) message.

In an operation scenario of multiple links, according to the implementation of the related art, the Block ACK needs to be fed back on each link, but in fact there is only one physical entity for receiving and sending, that is, there is only one distributing body for the packet, and in order to feed back the ACK on multiple links respectively, the packets need to be strictly divided and then distributed to each link for sending, that is because the sender needs to adjust a packet window sent according to the Block ACK fed back by the receiver, thus:

first, the complexity of managing the sending and receiving of data is increased, the data needs to be distributed according to the condition of network, and many sets of data packet sequence numbers are needed to manage the sending and receiving of data, which not only increases the complexity of the data sender, but also increases the complexity of data merging and reordering operations of the receiver; and second, when the network condition changes, a data sending and receiving scheme cannot be adjusted flexibly, which may lead to more data cache on a certain link due to the deterioration of the network condition, and a strict data distribution policy must be followed, and other links with good network condition cannot be used for sending, which reduces the throughput and efficiency of network.

The embodiments of the present disclosure puts forward a scheme for managing the sending and receiving of packet in a multi-link scenario, which solves the above problems through unified data management.

In the first aspect, a method for responding to data received by multiple links is provided, which may include that: a message initiator sends an Add Block ACK (ADDBA) request message to a message responder on multiple links respectively; the message initiator receives an ADDBA response message sent by the message responder on multiple links respectively, the ADDBA response message containing the parameter ML-BA Policy which indicates that the message responder allows usage modes of a multi-link collaborative block acknowledgement policy; and the message initiator sends a converged packet to the message responder on multiple links respectively.

The multi-link collaborative block acknowledgement policy refers to: in a scenario where there are multiple links receiving and sending data, it is needed to integrate packet receiving states on different links, and then a BA message is sent on one or multiple links. The BA message includes the packet receiving states on all links.

Exemplarily, the usage modes of the multi-link collaborative block acknowledgement policy includes at least one of the following: the multi-link collaborative block acknowledgement policy is not used; the multi-link collaborative block acknowledgement policy is used, and the link transmits a multi-link collaborative block acknowledgement policy message; and the multi-link collaborative block acknowledgement policy is used, and the link does not transmit the multi-link collaborative block acknowledgement policy message.

Optionally, the method may further include that: in a case that the parameter ML-BA Policy in the ADDBA response message indicates that the multi-link collaborative block acknowledgement policy is used, and the link transmits the multi-link collaborative block acknowledgement policy message, the message initiator sends a Block ACK Request (BAR) message to the message responder on the link; and in a case that the parameter ML-BA Policy in the ADDBA response message indicates that the multi-link collaborative block acknowledgement policy is used, and the link does not transmit the multi-link collaborative block acknowledgement policy message, the message initiator does not send the BAR message to the message responder on the link.

Exemplarily, the message initiator sends the BAR message to the message responder using either an explicit block acknowledgement request mode or an implicit block acknowledgement request mode. The explicit block acknowledgement request mode refers to sending a separate BAR message packet, and the implicit block acknowledgement request mode refers to containing an implicit BAR message in the sent packet.

Optionally, the method may further include that: one or multiple logical entities (STA) operating on different links in the message initiator receives the BA message sent by the message responder from one or multiple links, and sends information about the packets successfully received or/and the packets not received successfully in the BA message to a packet Transceiving Management Unit (PDU-TRMU) of the message initiator; and the PDU-TRMU of the message initiator sets the packet of the next converged packet on multiple links, and sends the converged packet to multiple STAs of the message initiator respectively, or sends the packet information to the multiple STAs of the message initiator respectively.

In a possible design, the ADDBA request message contains the parameter ML-BA Policy, which indicates the usage modes of the multi-link collaborative block acknowledgement policy that the message initiator requests.

Optionally, the method my further include that: the multiple STAs operating on different links in the message responder receive the ADDBA request message sent by the message initiator from multiple links, and send a message containing parameter information in the ADDBA request message to the PDU-TRMU of the message responder; the PDU-TRMU of the message responder determines a multi-link collaborative block acknowledgement policy execution table, and sends a message to the multiple STAs of the message responder according to the multi-link collaborative block acknowledgement policy execution table; and the multiple STAs of the message responder set the parameter ML-BA Policy in the ADDBA response message respectively according to the received message sent by the PDU-TRMU of the message responder.

Exemplarily, the multi-link collaborative block acknowledgement policy execution table includes the parameter ML-BA enable for indicating whether to use the multi-link collaborative block acknowledgement policy and the parameter ML-BA STA list for indicating a list of STAs of the message responder that needs to send block acknowledgement.

That the PDU-TRMU of the message responder sends the message to the STA of the message responder, and the STA of the message responder sets the parameter ML-BA Policy in the ADDBA response message includes that:
  in a case that the parameter ML-BA enable indicates that the multi-link collaborative block acknowledgement policy is used, the PDU-TRMU of the message responder sends a message to the STA in ML-BA STA list to instruct the STA not in the ML-BA STA list to set, in the ADDBA response message returned to the message initiator, the parameter ML-BA Policy as indicating that the multi-link collaborative block acknowledgement policy is used, and the link transmits the multi-link collaborative block acknowledgement policy message;
  in a case that the STA of the message responder receives the setting of the parameter ML-BA Policy in the message sent by the PDU-TRMU of the message responder, the ML-BA Policy is set according to the message sent by the PDU-TRMU of the message responder, or else, the ML-BA Policy is set as indicating that the multi-link collaborative block acknowledgement policy is not used.

Optionally, that the PDU-TRMU of the message responder sends the message to the STA of the message responder may further include that: the PDU-TRMU sends the message to the STA not in the ML-BA STA list to instruct the STA not in the ML-BA STA list to set, in the ADDBA response message returned to the message initiator, the parameter ML-BA Policy as indicating that the multi-link collaborative block acknowledgement policy is used, and the link does not transmit the multi-link collaborative block acknowledgement policy message.

Optionally, the method may further include that: the multiple STAs in the message responder receive the converged packet sent by the message initiator respectively from the multiple links, and send a message containing a packet number and a Traffic Identifier (TID) in the converged packet to the PDU-TRMU of the message responder; the PDU-TRMU of the message responder counts the packets received successfully or/and the packets not received successfully by the multiple STAs in the message responder, queries local information according to the TID or/and TA, and in a case that the corresponding ML-BA enable indicates that the multi-link collaborative block acknowledgement policy is used, feeds back the information about the packets received successfully or/and the packets not received successfully to the STA in the ML-BA STA list, the TA being used for indicating the address of the message initiator; and the STA in the ML-BA STA list sends the BA message to the message initiator.

In the second aspect, a device for responding to data received by multiple links is provided, which may include multiple STAs respectively operating on different links. When the device serves as the message initiator, the STA is configured to perform the following operations: the ADDBA request message is sent; the ADDBA response message is received, the ADDBA response message containing the parameter ML-BA Policy, which indicates that the message responder allows the usage modes of the multi-link collaborative block acknowledgement policy; and the converged packet is sent.

When the device serves as the message responder, the STA is configured to perform the following operations: the ADDBA request message is received; the ADDBA response message is sent; and the converged packet is received.

Optionally, when the device serves as the message initiator, the STA is further configured to perform the following operations: in a case that the parameter ML-BA Policy in the ADDBA response message indicates that the multi-link collaborative block acknowledgement policy is used, and the link transmits the multi-link collaborative block acknowledgement policy message, the BAR message is sent to the message responder on the link; and in a case that the parameter ML-BA Policy in the ADDBA response message indicates that the multi-link collaborative block acknowledgement policy is used, and the link does not transmit the multi-link collaborative block acknowledgement policy message, the BAR message is not sent to the message responder on the link.

Optionally, the device may further include the PDU-TRMU. When the device serves as the message initiator, the STA is further configured to perform the following operations: the BA message is received; and the information about the packets successfully received or/and the packets not received successfully in the BA message is sent to the PDU-TRMU. The PDU-TRMU performs the following operation: the packet of the next converged packet on multiple links is set, and the converged packet is sent to the STA respectively, or the packet information is sent to the STA respectively.

When the device serves as the message responder, the STA is further configured to perform the following operations: the message containing the parameter information in the ADDBA request message is sent to the PDU-TRMU; and the parameter ML-BA Policy in the ADDBA response message is set according to the received message sent by the PDU-TRMU. The PDU-TRMU performs the following operation: the multi-link collaborative block acknowledgement policy execution table is determined, and the message is sent to the STA according to the multi-link collaborative block acknowledgement policy execution table.

Optionally, when the device serves as the message responder, the STA is further configured to perform the following operation: the message containing the packet number and the TID in the converged packet is sent to the PDU-TRMU. The STA that needs to send the block acknowledgement is further configured to send the BA message.

The PDU-TRMU is further configured to perform the following operations: the packets received successfully or/and the packets not received successfully are counted, the local information is queried according to the TID or/and TA, and in a case that the corresponding parameter indicates that the multi-link collaborative block acknowledgement policy is used, the information about the packets received successfully or/and the packets not received successfully is fed back to the STA that needs to send the block acknowledgement. The TA is used for indicating the address of the message initiator.

BRIEF DESCRIPTION OF THE DRAWINGS

The present disclosure will be illustrated by embodiments and by reference to the accompanying drawings.

DETAILED DESCRIPTION OF THE EMBODIMENTS

The technical solutions of the present disclosure are described below in combination with the accompanying drawings.

In the embodiments of the present disclosure, the words like "exemplarily" and "for example" are used to serve as example, example illustration or explanation. Any embodiments or designs described as "example" in the present disclosure shall not be construed as being preferred or superior to other embodiments or designs. More exactly, the purpose of using the word "example" is to present the concept in a specific way.

For making the purpose, the technical solutions and the advantages of the present disclosure more clear, the present disclosure is further elaborated below in combination with the specific embodiments. It should be understood that the specific embodiments described here are only used for explaining the present disclosure, but not for limiting the present disclosure.

In the present disclosure, a Multi-Link Device (MLD) that initiates data transmission is called a message initiator, and the MLD that responds to the data transmission is called a message responder. In each of the following embodiments, only two links are used to illustrate the present disclosure to make the solution clearer, but the concept of the present disclosure is not limited to this and is also applied to a situation where there are more than two links.

In the following embodiments, MLD1 is the message initiator, STA1 and STA2 are logical entities respectively operating on link 1 and link 2 in the MLD1, MLD2 is the message responder, and STA3 and STA4 are logical entities respectively operating on the link 1 and the link 2 in the MLD2.

A multi-link collaborative block acknowledgement policy is that: in a scenario where there are multiple links receiving and sending data, it is needed to integrate packet receiving states on different links, and then a BA message is sent on one or multiple links. The BA message includes the packet receiving states on all links.

A method for responding to data received by multiple links in the present disclosure includes that: the message initiator sends an ADDBA request message to the message responder on multiple links respectively; the message initiator receives an ADDBA response message sent by the message responder on multiple links respectively, the ADDBA response message containing the parameter ML-BA Policy which indicates that the message responder allows usage modes of the multi-link collaborative block acknowledgement policy; and the message initiator sends a converged packet to the message responder on multiple links respectively.

In some embodiments, the method further includes that: the message initiator sends the BAR message to the message responder on one or multiple links according to the parameter ML-BA Policy in the ADDBA response message, and the message responder sends the BA message to the message initiator on one or multiple links.

In some embodiments, both the message initiator and the message responder may include a PDU-TRMU. The PDU-TRMU may be an internal logical unit or an external logical unit of the message initiator and the message responder. The message responder sends the received ADDBA request message and the corresponding information in the converged packet to its PDU-TRMU. The PDU-TRMU of the message responder determines the specific usage modes of the multi-link collaborative block acknowledgement policy by determining a multi-link collaborative block acknowledgement policy execution table, indicates the setting of the parameter ML-BA Policy in the ADDBA response message, and counts packet receiving states of the message responder on all the links. The message initiator sends the corresponding information in the received BA message to its PDU-TRMU, and the PDU-TRMU of the message initiator sets the packet of the next converged packet on multiple links.

Figure 1:
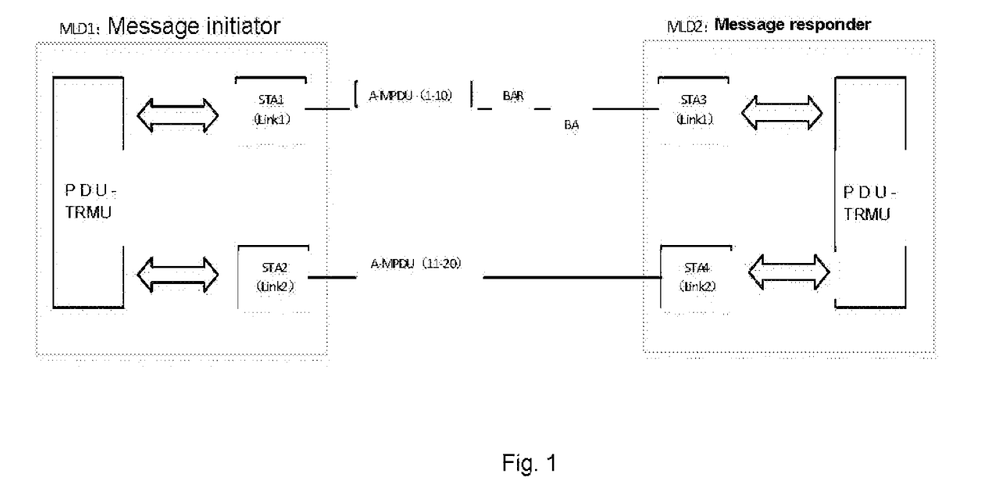
FIG. 1 is a schematic diagram of a method for responding to data received by multiple links according to an embodiment of the present disclosure.

FIG. 1 is a schematic diagram of a method for responding to data received by multiple links according to an embodiment of the present disclosure. In the embodiment, the message initiator sends the BAR message to the message responder using an explicit block acknowledgement request mode, that is, the message initiator sends a separate BAR message packet to the message responder. The method for responding to data received by multiple links includes the following steps.

In Step 1, the STA1 sends the ADDBA request message to the STA3. The message contains:
  a TID, which is used for identifying a service to which the data currently sent belongs; and
  a TA, which is used for indicating the address of the message initiator.

In some embodiments, the ADDBA request message may also contain the parameter ML-BA Policy, which indicates the usage modes of the multi-link collaborative block acknowledgement policy that the message initiator requests. Exemplarily, the parameter ML-BA Policy may be set as:
- "0", which represents that the multi-link collaborative block acknowledgement policy is not used;
- "1", which represents that the multi-link collaborative block acknowledgement policy is used, and the link transmits a multi-link collaborative block acknowledgement policy message; and
- "2", which represents that the multi-link collaborative block acknowledgement policy is used, and the link does not transmit the multi-link collaborative block acknowledgement policy message.

In Step 2, the STA3 sends the ACK message to the STA1 to indicate that the STA3 has received the ADDBA request message sent by the STA1.

In Step 3, the STA2 sends the ADDBA request message to the STA4. The message contains:
- the TID, which is used for identifying a service to which the data currently sent belongs; and the TA, which is used for indicating the address of the message initiator.

In some embodiments, the ADDBA request message may also contain the parameter ML-BA Policy, which indicates the usage modes of the multi-link collaborative block acknowledgement policy that the message initiator requests. Exemplarily, parameter values are set as in Step 1.

In Step 4, the STA4 sends the ACK message to the STA2 to indicate that the STA4 has received the ADDBA request message sent by the STA2.

In Step 5, the STA3 sends the ADDBA response message to the STA1. The message contains:
ML-BA Policy, which is used for indicating that the message responder allows the usage modes of the multi-link collaborative block acknowledgement policy. Exemplarily, the parameter ML-BA Policy may be set as:
- "0", which represents that the multi-link collaborative block acknowledgement policy is not used;
- "1", which represents that the multi-link collaborative block acknowledgement policy is used, and the link transmits a multi-link collaborative block acknowledgement policy message; and
- "2", which represents that the multi-link collaborative block acknowledgement policy is used, and the link does not transmit the multi-link collaborative block acknowledgement policy message.

In Step 6, the STA1 sends the ACK message to the STA3 to indicate that the STA1 has received the ADDBA response message sent by the STA3.

In Step 7, the STA4 sends the ADDBA response message to the STA2. The message contains:
the ML-BA Policy, which is used for indicating that the message responder allows the usage modes of the multi-link collaborative block acknowledgement policy. Exemplarily, the parameter values are set as in Step 5.

In Step 8, the STA2 sends the ACK message to the STA4 to indicate that the STA2 has received the ADDBA response message sent by the STA4.

In Step 9, the STA1 and the STA2 send the converged packets to the STA3 and the STA4 on the link 1 and the link 2 respectively. Optionally, it is possible to keep the end time of sending the packets on two links the same during the sending of data.

In Step 10, after the packets on the current two links are sent, the STA1 and the STA2 determine, according to the parameter ML-BA Policy in the received ADDBA response message, whether to send the BAR message. Exemplarily, in a case that the ML-BA Policy in the ADDBA response message received by the STA1 is "1", the BAR message is sent to the STA3; and in a case that the ML-BA Policy is "2", the BAR message is not sent to the STA3; in a case that the ML-BA Policy in the ADDBA response message received by the STA2 is "1", the BAR message is sent to the STA4; and in a case that the ML-BA Policy is "2", the BAR message is not sent to the STA4.

In some embodiments, the MLD1 and the MLD2 may also include the PDU-TRMU. The PDU-TRMU may be a logical unit included inside the MLD1 and the MLD2 or other devices that are independent of the MLD1 and the MLD2. In the present disclosure, the PDU-TRMU is a logical unit included inside the MLD1 and the MLD2, as shown in FIG. 1. When the MLD1 and the MLD2 include the PDU-TRMU, the method for responding to data received by multiple links includes the following steps.

In Step 1, the STA1 sends the ADDBA request message to the STA3. The message contains:
- the TID, which is used for identifying a service to which the data currently sent belongs; and
- the TA, which is used for indicating the address of the message initiator.

In some embodiments, the ADDBA request message may also contain the parameter ML-BA Policy, which indicates the usage modes of the multi-link collaborative block acknowledgement policy that the message initiator requests. Exemplarily, the parameter ML-BA Policy may be set as:
- "0", which represents that the multi-link collaborative block acknowledgement policy is not used;
- "1", which represents that the multi-link collaborative block acknowledgement policy is used, and the link transmits a multi-link collaborative block acknowledgement policy message; and
- "2", which represents that the multi-link collaborative block acknowledgement policy is used, and the link does not transmit the multi-link collaborative block acknowledgement policy message.

In Step 2, the STA3 sends the ACK message to the STA1 to indicate that the STA3 has received the ADDBA request message sent by the STA1.

In Step 3, the STA2 sends the ADDBA request message to the STA4. The message contains:
- the TID, which is used for identifying a service to which the data currently sent belongs; and
- the TA, which is used for indicating the address of the message initiator.

In some embodiments, the ADDBA request message may also contain the parameter ML-BA Policy, which indicates the usage modes of the multi-link collaborative block acknowledgement policy that the message initiator requests. Exemplarily, the parameter values are set as in Step 1.

In Step 4, the STA4 sends the ACK message to the STA2 to indicate that the STA4 has received the ADDBA request message sent by the STA2.

In Step 5, the STA3 and the STA4 send the parameter information in the ADDBA request messages received respectively to the PDU-TRMU of the MLD2. Exemplarily, the STA3 and the STA4 send the TID and the TA in the ADDBA request messages received respectively to the PDU-TRMU of the MLD2, and in a case that the ADDBA request message also includes the parameter ML-BA Policy, the STA3 and the STA4 also send the ML-BA Policy along with the TID and the TA.

In Step 6, the PDU-TRMU of the message responder determines the multi-link collaborative block acknowledgement policy execution table.

Exemplarily, the PDU-TRMU may determine the execution table according to local capabilities or policies, or according to the parameters, such as whether the TIDs in the ADDBA request are the same, or whether the ADDBA request indicates that the multi-link collaborative block acknowledgement policy is required, in the ADDBA request of the message initiator provided by the STA3 and the STA4, which is not limited by the present disclosure. Exemplarily, the setting of the multi-link collaborative block acknowledgement policy execution table is shown in Table 1.

TABLE 1

| TA | TID | ML-BA enable | ML-BA STA list |
|---|---|---|---|
| Address of message initiator | Traffic identifier | 0 represents that the multi-link collaborative block acknowledgement policy is not used; 1 represents that the multi-link collaborative block acknowledgement policy is used | A list of STAs that need to send BA |

Or, when the TID is uniquely allocated to a message initiator, the TID may also identify the message initiator, or TA information is not required. In this case, the setting of the multi-link collaborative block acknowledgement policy execution table is shown in Table 2.

TABLE 2

| TID | ML-BA enable | ML-BA STA list |
|---|---|---|
| Traffic identifier | 0 represents that the multi-link collaborative block acknowledgement policy is not used; 1 represents that the multi-link collaborative block acknowledgement policy is used | A list of STAs that need to send BA |

In Step 7, the PDU-TRMU of the message responder sends a message to the STA of the message responder according to the multi-link collaborative block acknowledgement policy execution table. Exemplarily, details are as follows.

In a case that the ML-BA enable is "1", a message is sent to the STA in the ML-BA STA list to instruct the STA not in the ML-BA STA list to set the ML-BA Policy as "1" in the ADDBA response message returned to the message initiator, and a message is sent to the STA not in the M L-BA STA list to instruct the STA not in the ML-BA STA list to set the ML-BA Policy as "2" in the ADDBA response message returned to the message initiator.

In Step 8, the STA3 sends the ADDBA response message to the STA1. The message contains:
ML-BA Policy, which is used for indicating that the message responder allows the usage modes of the multi-link collaborative block acknowledgement policy. Exemplarily, in a case that the setting of the parameter in the message sent by the PDU-TRMU is received, the parameter is set according to the message sent by the PDU-TRMU; or else, the parameter is set to "0".

In Step 9, the STA1 sends the ACK message to the STA3 to indicate that the STA1 has received the ADDBA response message sent by the STA3.

In Step 10, the STA4 sends the ADDBA response message to the STA2. The message contains:
the ML-BA Policy, which is used for indicating that the message responder allows the usage modes of the multi-link collaborative block acknowledgement policy. Exemplarily, in a case that the setting of the parameter in the message sent by the PDU-TRMU is received, the parameter is set according to the message sent by the PDU-TRMU; or else, the parameter is set to "0".

In Step 11, the STA2 sends the ACK message to the STA4 to indicate that the STA2 has received the ADDBA response message sent by the STA4.

In Step 12, the STA1 and the STA2 send the converged packets to the STA3 and the STA4 on the link 1 and the link 2 respectively. Optionally, it is possible to keep the end time of sending the packets on two links the same during the sending of data.

In Step 13, after the packets on the current two links are sent, the STA1 and the STA2 determine, according to the parameter ML-BA Policy in the received ADDBA response message, whether to send the BAR message. Exemplarily,
in a case that the ML-BA Policy in the ADDBA response message received by the STA1 is "1", the BAR message is sent to the STA3; and in a case that the ML-BA Policy is "2", the BAR message is not sent to the STA3;
in a case that the ML-BA Policy in the ADDBA response message received by the STA2 is "1", the BAR message is sent to the STA4; and in a case that the ML-BA Policy is "2", the BAR message is not sent to the STA4.

In Step 14, after receiving the converged packet, the STA3 and the STA4 send the packet number and the TID in the converged packet to the PDU-TRMU of the MLD2.

In Step 15, the PDU-TRMU of the MLD2 counts the packets received successfully or/and the packets not received successfully in the STA3 and the STA4, queries the local information according to the TID or/and the TA, and in a case that the corresponding ML-BA enable indicates that the multi-link collaborative block acknowledgement policy is used, feeds back the information about the packets received successfully or/and the packets not received successfully to the STA in the ML-BA STA list.

In Step 16, the STA in the M L-BA STA list sends the BA message to the corresponding STA in the message initiator. For example,
in a case that it is "STA3" in the ML-BA STA list, then the STA3 sends the BA message to the STA1;
in a case that it is "STA4" in the ML-BA STA list, then the STA4 sends the BA message to the STA2;
in a case that it is "STA3, STA4" in the ML-BA STA list, then the STA3 sends the BA message to the STA1, and the STA4 sends the BA message to the STA2.

In Step 17, the STA1 or/and the STA2 send the information about the packets received successfully or/and the packets not received successfully in the BA message to the PDU-TRMU of the message initiator.

In Step 18, the PDU-TRMU of the message initiator sets the packet of the next converged packet on the link 1 and the link 2, and sends the converged packet to the STA1 and the STA2 respectively, or sends the packet information to the STA1 and the STA2 respectively.

In Step 19, the STA1 and the STA2 send the corresponding converged packet according to the received information.

Figure 2:
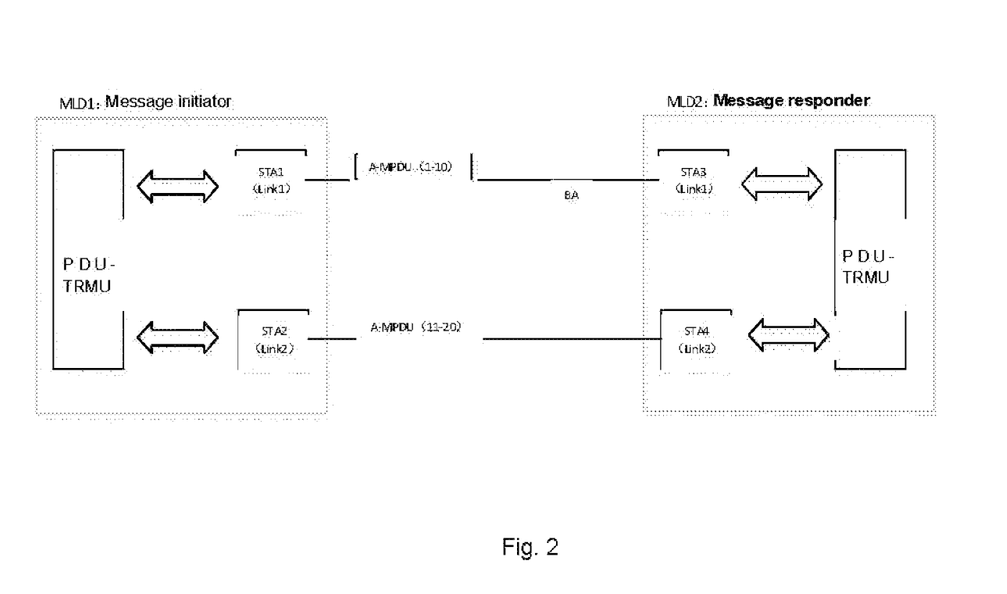
FIG. 2 is a schematic diagram of a method for responding to data received by multiple links according to another embodiment of the present disclosure.

FIG. 2 is a schematic diagram of a method for responding to data received by multiple links according to another embodiment of the present disclosure. In the embodiment, the message initiator sends the BAR message to the message responder using an implicit block acknowledgement request mode, that is, the message initiator includes an implicit BAR message in the packet sent to the message responder. For example, in the QoS control field of the packet, the ACK Policy field is set to "00" to indicate that the message responder is required to send the BA message. The rest of the embodiment is the same as the embodiment shown in FIG. 1 and will not be repeated here.

An embodiment of the present disclosure also provides a device for responding to data received by multiple links. The device may serve as either the message initiator or the message responder, and includes multiple STAs respectively operating on different links. In some embodiments, the device may also include the PDU-TRMU.

The device for responding to data received by multiple links provided by the embodiment is used for implementing the method for responding to data received by multiple links in the embodiment shown in FIG. 1 or FIG. 2. The realization principles and technical effects of the device for responding to data received by multiple links provided by the embodiment are similar to that of the method, and will not be repeated here.

It should be understood that, in various embodiments of the present disclosure, a magnitude of a sequence number of each process does not mean an execution sequence, part or all of the steps can be executed in parallel or in sequence, and the execution sequence of each process should be determined by its function and an internal logic and should not form any limit to an implementation process of the embodiments of the present disclosure.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the device and unit described above may refer to the corresponding processes in the method embodiment and will not be elaborated herein for convenient and brief description In some embodiments provided by the present disclosure, it is to be understood that the disclosed device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including multiple instructions configured to enable a computer device (which may be a personal computer, a server, a network device or a terminal device, etc.) to execute all or part of the steps of the method in each embodiment of the application. The storage media include: various media capable of storing program codes such as a USB flash disk, a mobile hard disk, a ROM, a RAM, a magnetic disk or a compact disc.

The terms used in the embodiments of the present disclosure are for the purpose of describing particular embodiments only and are not intended to limit the present disclosure. The singular forms "a", "an" and "the" used in the embodiments of the present disclosure and the appended claims of the present disclosure are also intended to include the plural forms unless the context clearly indicates otherwise. It is also to be understood that the term "and/or" as used herein refers to and includes any or all possible combinations of one or more of the associated listed items. The character "/" in the present disclosure usually represents that previous and next associated objects form an "or" relationship.

The term "if" or "in case" used here may be explained as "while" or "when" or "responsive to determining" or "responsive to detecting", which depends on the context. Similarly, based on the context, phrase "in a case that determining" or "in a case that detecting (stated condition or event)" may be explained as "when determining" or "responsive to determining" or "when detecting (stated condition or event)" or "responsive to detecting (stated condition or event)".

Those of ordinary skill in the art may understand that all or part of the steps in the method of the above embodiment may be completed through related hardware instructed by a program, the program may be stored in a readable storage medium of a device, and when the program is executed, all or part of the steps are included. The stored media are, for example, FLASH, EEPROM, etc.

The above is only the specific implementation manner of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What claimed is:
1. A method for responding to data received by multiple links, comprising:
    sending, by a message initiator, an Add Block ACK (ADDBA) request message to a message responder on multiple links respectively;

receiving, by the message initiator, an ADDBA response message sent by the message responder on multiple links respectively, the ADDBA response message containing a parameter ML-BA Policy, which indicates that the message responder allows usage modes of a multi-link collaborative block acknowledgement policy; and sending, by the message initiator, a converged packet to the message responder on multiple links respectively;

in a case that the parameter ML-BA Policy in the ADDBA response message indicates that the multi-link collaborative block acknowledgement policy is used, and the link transmits the multi-link collaborative block acknowledgement policy message, sending, by the message initiator, a Block ACK Request (BAR) message to the message responder on the link; and in a case that the parameter ML-BA Policy in the ADDBA response message indicates that the multi-link collaborative block acknowledgement policy is used, and the link does not transmit the multi-link collaborative block acknowledgement policy message, not sending, by the message initiator, the BAR message to the message responder on the link.

2. The method for responding to data received by multiple links as claimed in claim 1, wherein the usage modes of the multi-link collaborative block acknowledgement policy comprises at least one of the following:

the multi-link collaborative block acknowledgement policy is not used;

the multi-link collaborative block acknowledgement policy is used, and the link transmits a multi-link collaborative block acknowledgement policy message; and the multi-link collaborative block acknowledgement policy is used, and the link does not transmit the multi-link collaborative block acknowledgement policy message.

3. The method for responding to data received by multiple links as claimed in claim 1, wherein the message initiator sends the BAR message to the message responder using either an explicit block acknowledgement request mode or an implicit block acknowledgement request mode; the explicit block acknowledgement request mode refers to sending a separate BAR message packet, and the implicit block acknowledgement request mode refers to containing an implicit BAR message in the sent packet.

4. The method for responding to data received by multiple links as claimed in claim 1, further comprising:

receiving, by one or multiple logical entities (STA) operating on different links in the message initiator, the BA message sent by the message responder from one or multiple links, and sending information about the packets successfully received or/and the packets not received successfully in the BA message to a packet Transceiving Management Unit (PDU-TRMU) of the message initiator; and setting, by the PDU-TRMU of the message initiator, the packet of the next converged packet on multiple links, and sending the converged packet to multiple STAs of the message initiator respectively, or sending the packet information to the multiple STAs of the message initiator respectively.

5. The method for responding to data received by multiple links as claimed in claim 1, wherein the ADDBA request message contains the parameter ML-BA Policy, which indicates the usage modes of the multi-link collaborative block acknowledgement policy that the message initiator requests.

6. The method for responding to data received by multiple links as claimed in claim 1, further comprising:

receiving, by the multiple STAs operating on different links in the message responder, the ADDBA request message sent by the message initiator from multiple links, and sending a message containing parameter information in the ADDBA request message to the PDU-TRMU of the message responder;

determining, by the PDU-TRMU of the message responder, a multi-link collaborative block acknowledgement policy execution table, and sending a message to the multiple STAs of the message responder according to the multi-link collaborative block acknowledgement policy execution table; and setting, by the multiple STAs of the message responder, the parameter ML-BA Policy in the ADDBA response message respectively according to the received message sent by the PDU-TRMU of the message responder.

7. The method for responding to data received by multiple links as claimed in claim 6, wherein the multi-link collaborative block acknowledgement policy execution table comprises the parameter ML-BA enable for indicating whether to use the multi-link collaborative block acknowledgement policy and the parameter ML-BA STA list for indicating a list of STAs of the message responder that needs to send block acknowledgement;

sending, by the PDU-TRMU of the message responder, the message to the STA of the message responder, and setting, by the STA of the message responder, the parameter ML-BA Policy in the ADDBA response message comprises:

in a case that the parameter ML-BA enable indicates that the multi-link collaborative block acknowledgement policy is used, sending, by the PDU-TRMU of the message responder, a message to the STA in ML-BA STA list to instruct the STA not in the ML-BA STA list to set, in the ADDBA response message returned to the message initiator, the parameter ML-BA Policy as indicating that the multi-link collaborative block acknowledgement policy is used, and the link transmits the multi-link collaborative block acknowledgement policy message; and in a case that the STA of the message responder receives the setting of the parameter ML-BA Policy in the message sent by the PDU-TRMU of the message responder, setting the ML-BA Policy according to the message sent by the PDU-TRMU of the message responder, or else, setting the ML-BA Policy as indicating that the multi-link collaborative block acknowledgement policy is not used.

8. The method for responding to data received by multiple links as claimed in claim 7, wherein sending, by the PDU-TRMU of the message responder, the message to the STA of the message responder comprises:

sending a message to the STA not in the ML-BA STA list to instruct the STA not in the ML-BA STA list to set, in the ADDBA response message returned to the message initiator, the parameter ML-BA Policy as indicating that the multi-link collaborative block acknowledgement policy is used, and the link does not transmit the multi-link collaborative block acknowledgement policy message.

9. The method for responding to data received by multiple links as claimed in claim 7, further comprising:

receiving, by the multiple STAs in the message responder, the converged packet sent by the message initiator respectively from the multiple links, and sending a message containing a packet number and a Traffic Identifier (TID) in the converged packet to the PDU-TRMU of the message responder;

counting, by the PDU-TRMU of the message responder, the packets received successfully or/and the packets not received successfully by the multiple STAs in the message responder, querying local information according to the TID or/and TA, and in a case that the corresponding ML-BA enable indicates that the multi-link collaborative block acknowledgement policy is used, feeding back the information about the packets received successfully or/and the packets not received successfully to the STA in the ML-BA STA list, wherein the TA is used for indicating the address of the message initiator; and sending, by the STA in the ML-BA STA list, the BA message to the message initiator.

10. A device for responding to data received by multiple links, comprising: multiple logical entities (STA) respectively operating on different links;

when the device serves as a message initiator, the STA is configured to perform the following operations:

sending an Add Block ACK (ADDBA) request message;

receiving an ADDBA response message, the ADDBA response message containing a parameter ML-BA Policy, which indicates that a message responder allows usage modes of a multi-link collaborative block acknowledgement policy; and sending a converged packet; in a case that the parameter ML-BA Policy in the ADDBA response message indicates that the multi-link collaborative block acknowledgement policy is used, and the link transmits the multi-link collaborative block acknowledgement policy message, sending a Block ACK Request (BAR) message to the message responder on the link; and in a case that the parameter ML-BA Policy in the ADDBA response message indicates that the multi-link collaborative block acknowledgement policy is used, and the link does not transmit the multi-link collaborative block acknowledgement policy message, not sending the BAR message to the message responder on the link;

when the device serves as a message responder, the STA is configured to perform the following operations:

receiving the ADDBA request message; sending the ADDBA response message; and receiving the converged packet.

11. The device for responding to data received by multiple links as claimed in claim 10, further comprising a packet Transceiving Management Unit (PDU-TRMU);

when the device serves as the message initiator, the STA is further configured to perform the following operations: receiving the BA message; and sending information about the packets successfully received or/and the packets not received successfully in the BA message to the PDU-TRMU; the PDU-TRMU performs the following operation: setting the packet of the next converged packet on multiple links, and sending the converged packet to the STA respectively, or sending the packet information to the STA respectively; and when the device serves as the message responder, the STA is further configured to perform the following operations: sending a message containing parameter information in the ADDBA request message to the PDU-TRMU; and setting the parameter ML-BA Policy in the ADDBA response message according to the received message sent by the PDU-TRMU; the PDU-TRMU performs the following operation: determining a multi-link collaborative block acknowledgement policy execution table, and sending a message to the STA according to the multi-link collaborative block acknowledgement policy execution table.

12. The device for responding to data received by multiple links as claimed in claim 11, wherein when the device serves as the message responder, the STA is further configured to perform the following operation: sending a message containing a packet number and a Traffic Identifier (TID) in the converged packet to the PDU-TRMU; the STA that needs to send the block acknowledgement is further configured to send the BA message;

the PDU-TRMU is further configured to perform the following operations: counting the packets received successfully or/and the packets not received successfully, querying local information according to the TID or/and TA, and in a case that the corresponding parameter indicates that the multi-link collaborative block acknowledgement policy is used, feeding back the information about the packets received successfully or/and the packets not received successfully to the STA that needs to send the block acknowledgement, wherein the TA is used for indicating the address of the message initiator.

* * * * *